M. H. ROBERTS.
EGG BEATER.
APPLICATION FILED AUG. 11, 1921.

1,413,874.

Patented Apr. 25, 1922.

INVENTOR:
Maurice H. Roberts
by Macleod, Cahn, Copeland & Dike
Attys.

UNITED STATES PATENT OFFICE.

MAURICE H. ROBERTS, OF BOSTON, MASSACHUSETTS, ASSIGNOR TO HARRIS COMPANY, INC., OF BOSTON, MASSACHUSETTS, A CORPORATION OF MASSACHUSETTS.

EGG BEATER.

1,413,874.      Specification of Letters Patent.     Patented Apr. 25, 1922.

Application filed August 11, 1921. Serial No. 491,606.

*To all whom it may concern:*

Be it known that I, MAURICE H. ROBERTS, a citizen of the United States, residing at Boston, county of Suffolk, State of Massachusetts, have invented a certain new and useful Improvement in Egg Beaters, of which the following is a specification, reference being had therein to the accompanying drawings.

The present invention relates to egg beaters of the rotary type having a shaft with blades which rotate with the shaft. One object of the present invention is to improve this type of egg beater by combining with it a dash which is operated at the same time that the blades are rotated. Another feature of the invention relates to the form of the blades.

The invention will be fully understood from the following description when taken in connection with the accompanying drawings, and the novel features thereof will be pointed out and clearly defined in the claims at the close of this specification.

Figure 1:
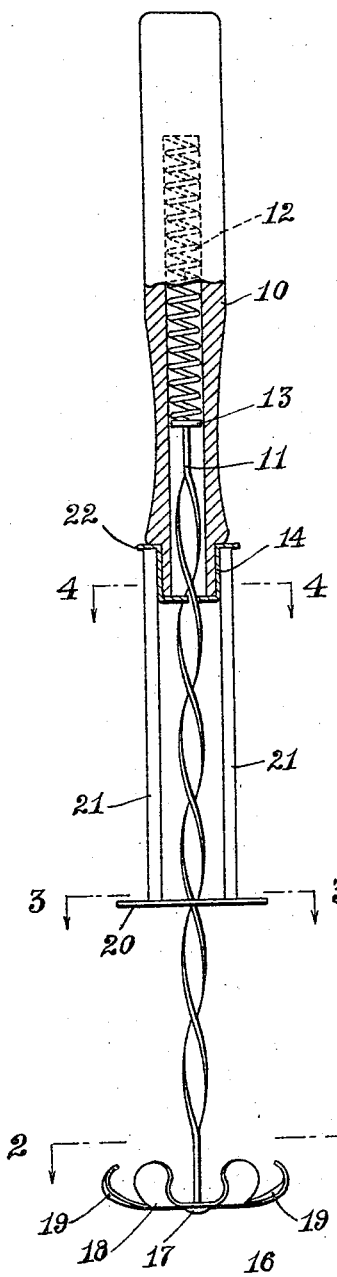

In the drawings, Fig. 1 is a view in elevation partly in section of a device embodying the invention.

Figure 4:
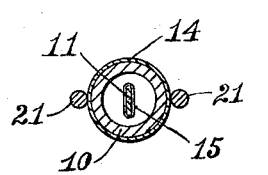
Figure 5:
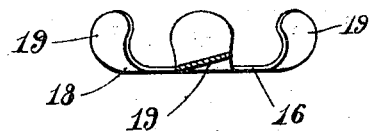
Figure 3:
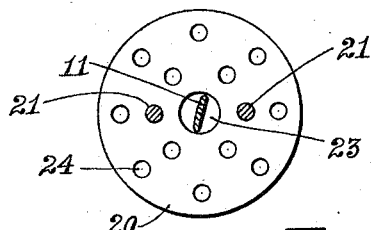
Figure 2:
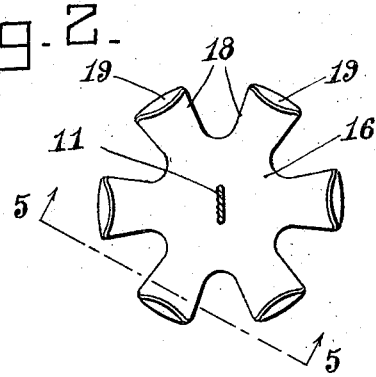

Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 2.

Referring now to the drawings, at 10 is shown a handle which is formed with a socket to receive the shaft 11 and a spring 12, one end of which is seated in the upper end of the socket of the handle, and the other end of which is seated upon a disk 13 on the upper end of the shaft 11.

The shaft 11 is made of flat metal twisted so that the edges are of spiral form. Secured to the lower end of the handle 10 is a thimble 14 formed with an elongated slot 15 in its lower closed end through which the shaft 11 passes. By resting the lower end of the shaft on a support, as for instance on the bottom of a cup which contains the egg which is to be beaten, and pressing down on the upper end of the handle 10, the shaft will be rotated in well-known manner by reason of the twisted form of the shaft and the elongated form of the slot 15. When the downward pressure upon the handle is released the spring 12 which was compressed when the handle was pushed down will throw the handle up and cause the shaft 11 to rotate in the reverse direction.

The beater blade disk 16 is secured to the lower end of the shaft, as by a screw or button 17. The said disk 16 is formed with a plurality of radially disposed blades 18 which are turned upwards toward their outer ends, and which also preferably have a slight pitch transversely, as indicated at 19, somewhat after the manner of a propeller blade, so that as the shaft rotates the paddle blades carried thereby will tend to pitch upwards and sideways the ingredients in the receptacle, each propeller blade giving an upward toss to the contents with which it comes in contact as well as stirring them.

A plunger disk 20 which operates as a dash is rigidly connected with the handle 10 so as to move up and down with the handle. Preferably this connection is made by means of rods 21—21 which serve as hangers, the lower ends of which are connected with the dash member 20 and the upper ends of which are connected with a disk 22 which is formed as a flange on the upper end of the thimble 14 and thus made fast to the handle 10. The said disk 20 is formed with a central opening 23 through which the shaft 11 freely passes, so that as the handle is moved up and down to rotate the shaft 11 and the paddle disk at the lower end of the shaft, the said dash disk 20 will move up and down without rotation.

The said disk 20 is formed with a plurality of apertures 24 so that when it is moved up and down a portion of the contents will pass through the said apertures. If the disk were made solid its up and down movement would be seriously impeded. The apertures, however, afford sufficient vent so that the up and down movement of the disk 20 is not seriously impeded and at the same time the contents of the container which are being beaten are cut to a considerable extent by reason of the forced passage through the said apertures.

It will thus be seen that by holding the lower end of the shaft against the bottom of the container and reciprocating the handle 10 rapidly up and down in well-known manner, the stirrer blades 19 will be caused to rapidly rotate first in one direction and then in the other, stirring up the contents of the receptacle which is at the bottom, and also by reason of the peculiar formation of the blades tossing the contents from the bottom upwards and toward the center and at the same time the dash 20 will be moved up and down giving a still different cutting movement to the contents.

The blades 19 act very much like a whirling propeller which throws the ingredients to the center of the receptacle as well as up, and they are then caught by the dasher with an up-and-down motion that forces air into the ingredient and converts it into a smooth, light and frothy substance.

It is very useful for whipping cream, beating eggs, omelettes, custards, malted milk, and all kinds of drinks and mixtures. Therefore, while I have for convenience referred to the device as an egg beater, I wish it to be understood that the claims are intended to cover the device whether used strictly as an egg beater or for any other purpose for which it is adapted.

What I claim is:—

1. An egg beater having a rotary shaft provided with a series of laterally extending paddles on its lower end, a vertically movable dasher mounted above the said paddles through which the said shaft loosely passes, and means for rotating the said shaft and paddles first in one direction and then reversing the direction of rotation and simultaneously reciprocating the dasher up and down, the dasher being at all times entirely above the paddles.

2. An egg beater having a rotary shaft provided with a series of laterally extending paddles on its lower end, a vertical handle having a socket into which the upper end of said shaft extends, a spring in said socket on which the upper end of said shaft is seated, means whereby when the lower end of said shaft is raised on its support and said handle is reciprocated up and down, the said shaft will be rotated first in one direction and then in the other, and a plunger disk mounted on said handle, said disk being apertured for the passage of the shaft, whereby as the handle is operated to actuate the rotary shaft the said plunger will also be reciprocated up and down, said plunger disk being formed with a plurality of apertures.

3. An egg beater having a rotary worm shaft provided with a plurality of radiating blades secured to its lower end, a plunger handle having a longitudinal socket in which the upper end of the shaft is received, a spring in the upper part of said socket on which the upper end of the shaft is seated, the handle being provided at its lower end with a slotted entrance to said socket through which the shaft passes, said slot being so shaped with relation to the shaft that as the handle is vertically reciprocated while the lower end of the shaft rests on a bottom support the shaft will be rotated alternately in opposite directions, a disk rigidly suspended from the lower end of the handle in such manner that the disk is at all times some distance below the lower end of the handle and above the rotary blades at the lower end of the shaft, the shaft passing loosely through a hole in the disk so that the disk can move freely up and down with the operation of the handle simultaneously with the rotation of the blades.

4. An egg beater having a rotary worm shaft provided with a plurality of radiating blades secured to its lower end, a plunger handle having a longitudinal socket in which the upper end of the shaft is received, a spring in the upper part of said socket on which the upper end of the shaft is seated, the handle being provided at its lower end with a slotted entrance to said socket through which the shaft passes, said slot being so shaped with relation to the shaft that as the handle is vertically reciprocated, while the lower end of the shaft rests on a bottom support, the shaft will be rotated alternately in opposite directions, hangers secured to the lower end of the handle and rigidly supporting at their lower ends, a disk which is thus suspended at some distance below the lower end of the handle and above the rotary blades on the lower end of the shaft, said disk being non-rotatable, the said shaft passing loosely through a hole in the disk so that the disk can move freely up and down with the handle and with relation to the blades, said disk being reciprocated by the reciprocating movement of the handle simultaneously with the rotation of the blades.

In testimony whereof I affix my signature.

MAURICE H. ROBERTS.